Nov. 13, 1923.

R. C. FRANCKE

BOX CAR UNLOADER

Filed Dec. 16, 1920      6 Sheets-Sheet 1

1,473,815

WITNESSES
G. F. Miller
H. D. Chase

INVENTOR
Rudolph C. Francke
By R. S. Caldwell
ATTORNEY

Nov. 13, 1923.

R. C. FRANCKE

BOX CAR UNLOADER

Filed Dec. 16, 1920

1,473,815

6 Sheets-Sheet 2

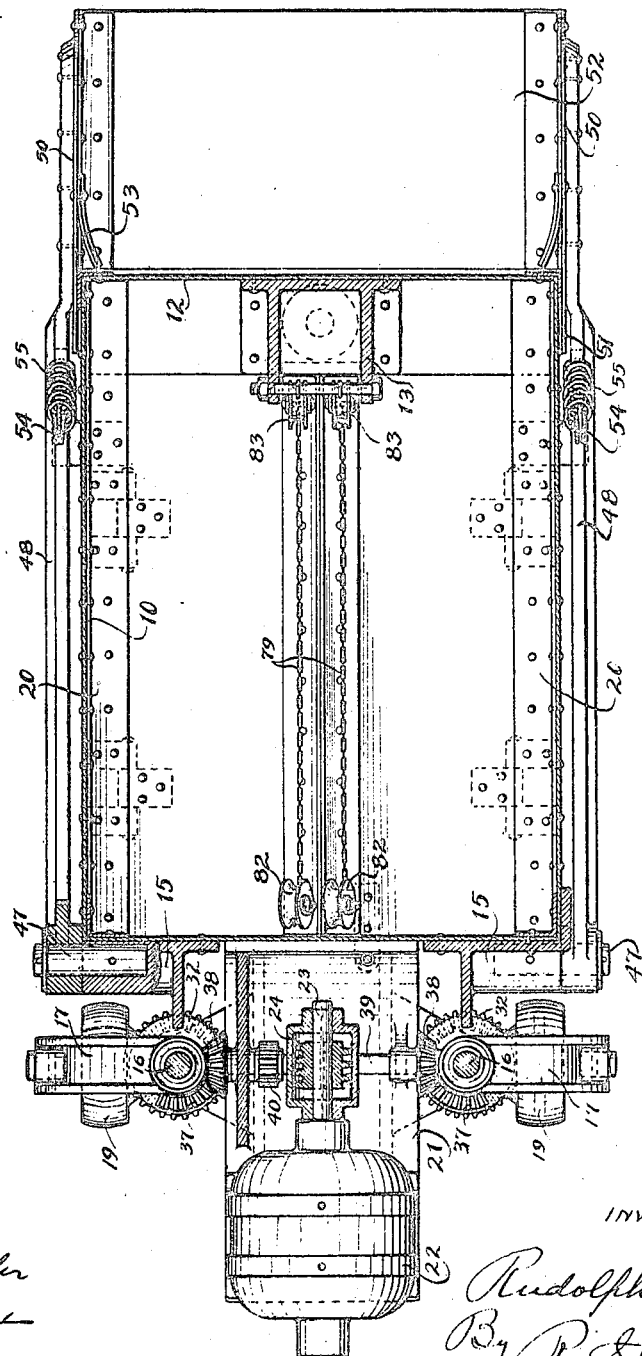

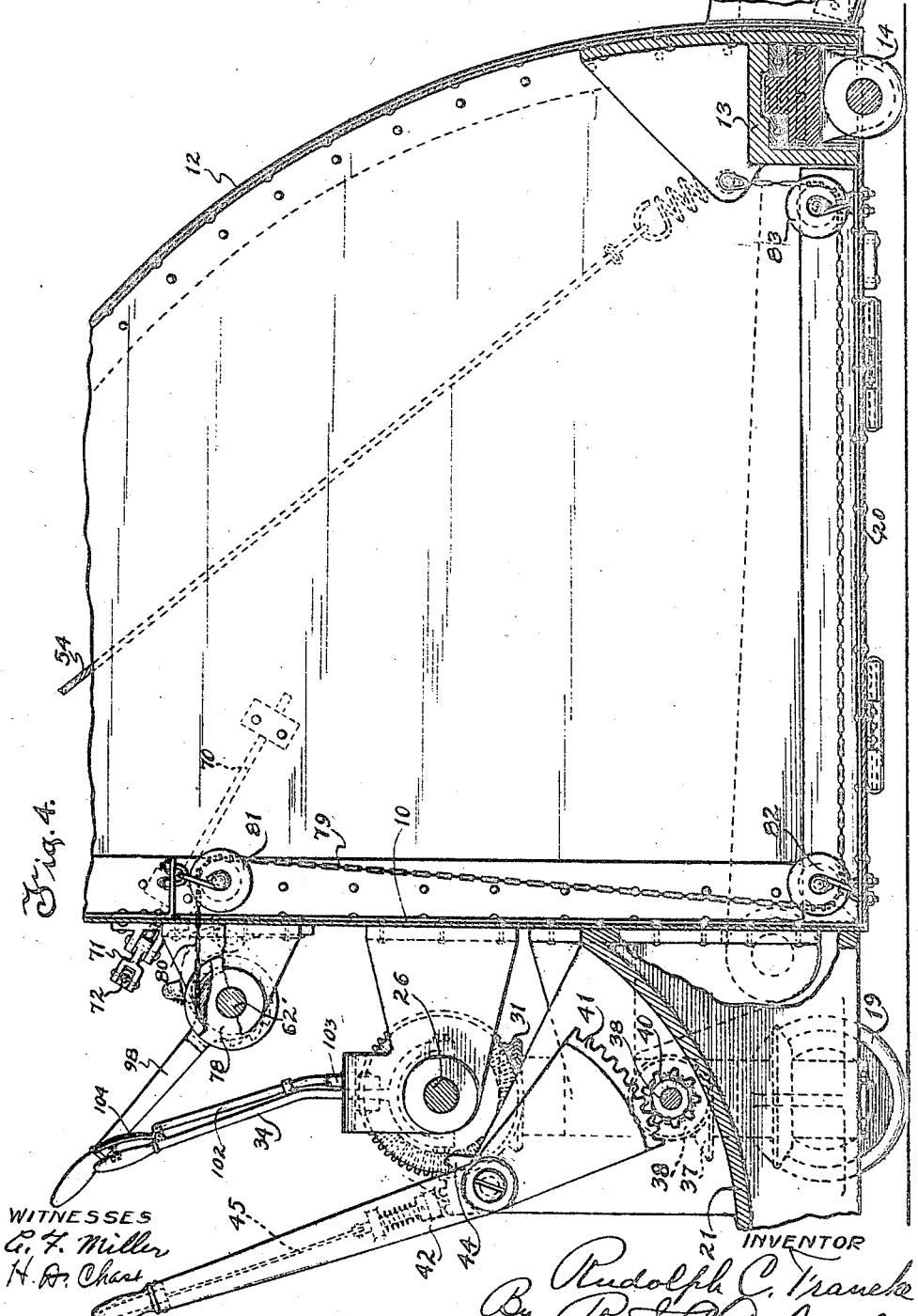

Nov. 13, 1923. 1,473,815
R. C. FRANCKE
BOX CAR UNLOADER
Filed Dec. 16, 1920 6 Sheets-Sheet 5
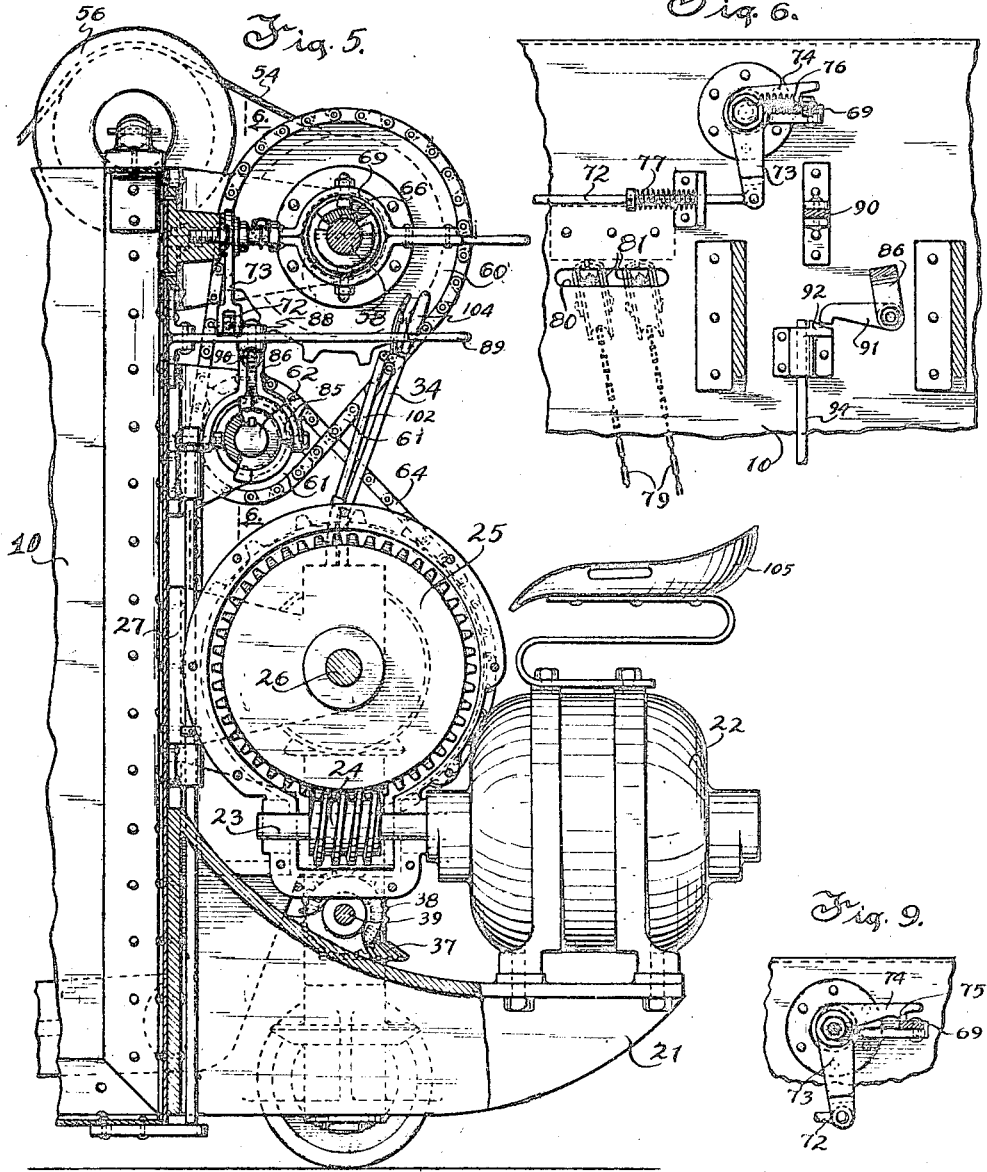
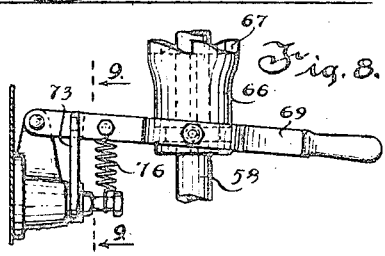

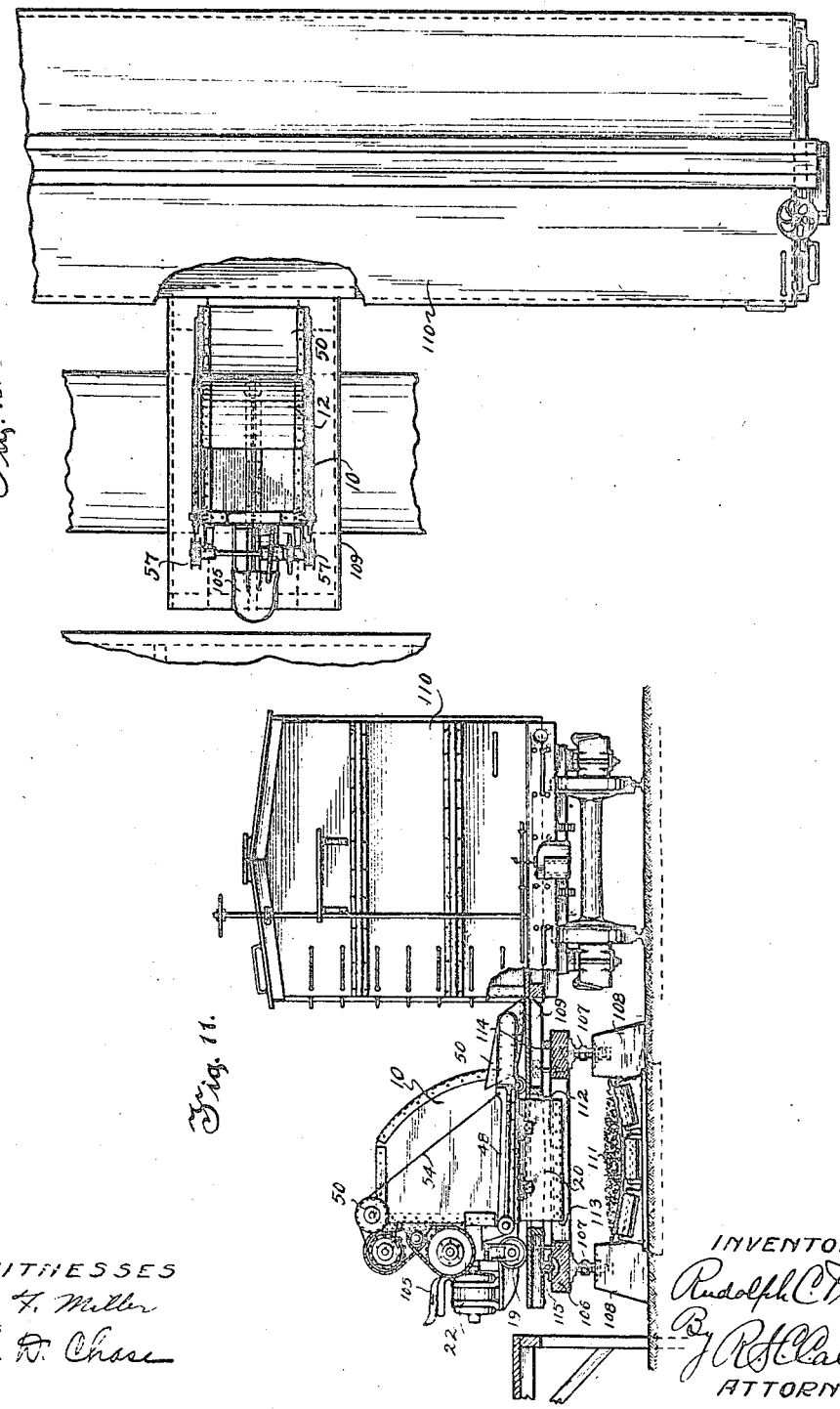

Patented Nov. 13, 1923.

1,473,815

UNITED STATES PATENT OFFICE.

RUDOLPH C. FRANCKE, OF MILWAUKEE, WISCONSIN.

BOX-CAR UNLOADER.

Application filed December 16, 1920. Serial No. 431,146.

*To all whom it may concern:*

Be it known that I, RUDOLPH C. FRANCKE, a citizen of the United States, and resident of Milwaukee, in the county of Milwaukee and State of Wisconsin, whose post-office address is 923 23d Ave., Milwaukee, Wisconsin, have invented new and useful Improvements in Box-Car Unloaders, of which the following is a description, reference being had to the accompanying drawings, which are a part of this specification.

The invention relates to unloading devices more particularly designed for unloading bulk material from box cars though it may be used for other purposes, for conveying bulk material, packages or articles from one place to another.

In the unloading of coal or other bulk material from box cars the machine to be effective should be power-driven, be compact and possessed of the greatest flexibility of movement to enable it to work in a small space and maneuver in said space. In the present invention the device carries its own motor, can be moved forwardly or backwardly, can be turned in its own length and can be easily moved into and out of the door of a box car and turned while or after entering the door, a scoop being employed to take up a quantity of coal and deliver it to a temporary storage hopper on the machine, the scoop receiving its load by the movement of the machine.

A further object of the invention is to provide a self-propelled machine having a temporary storage hopper for receiving the material automatically loaded in it with mechanism for discharging the material in the hopper upon another conveying or transporting device.

A further object of the invention is to provide an automatic control for the mechanism elevating the scoop.

A further object of the invention is to provide an automatic control for the bottom dumping doors of the storage hopper.

The invention further consists in the several features hereinafter set forth and more particularly defined by claims at the conclusion hereof.

Figure 1:
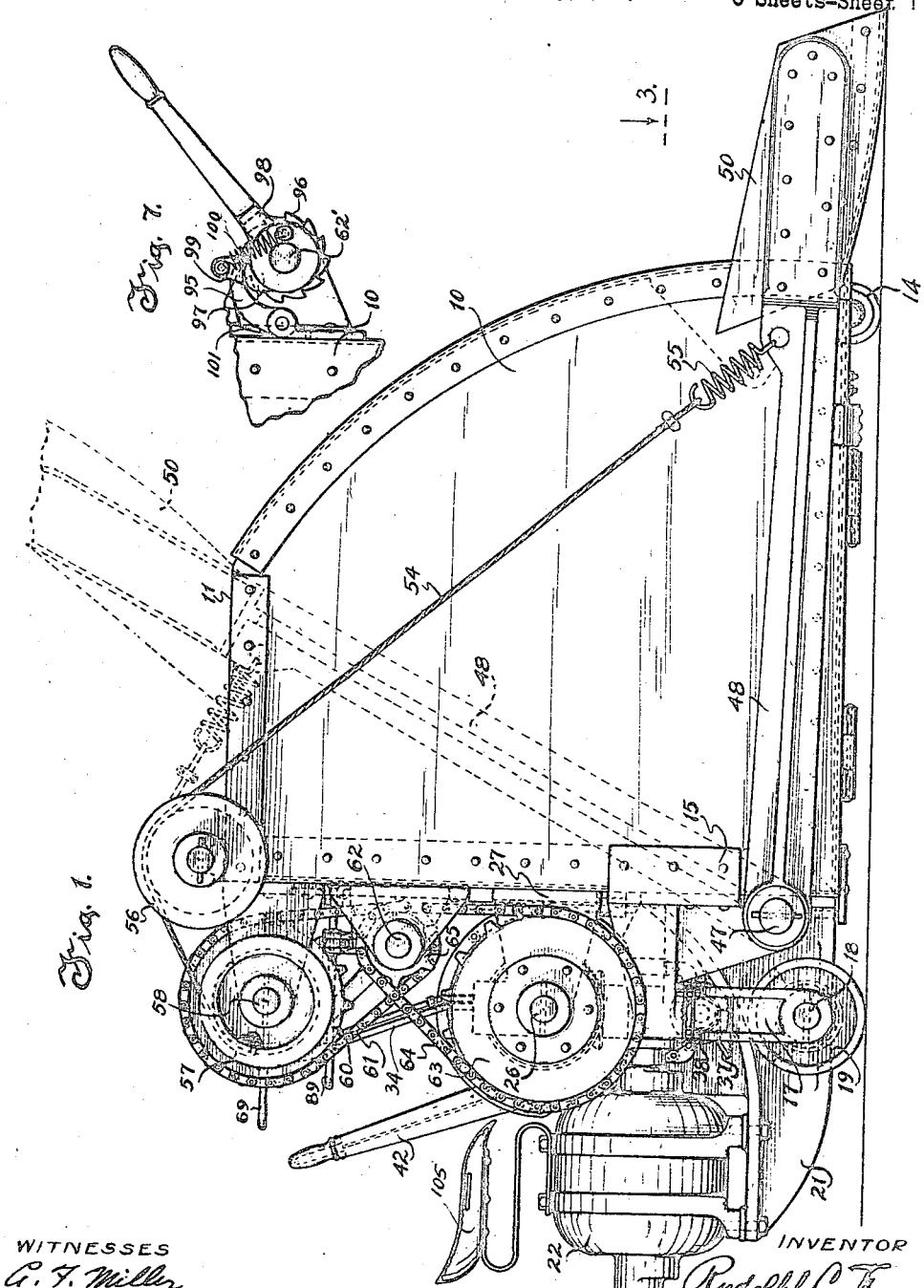
Figure 2:
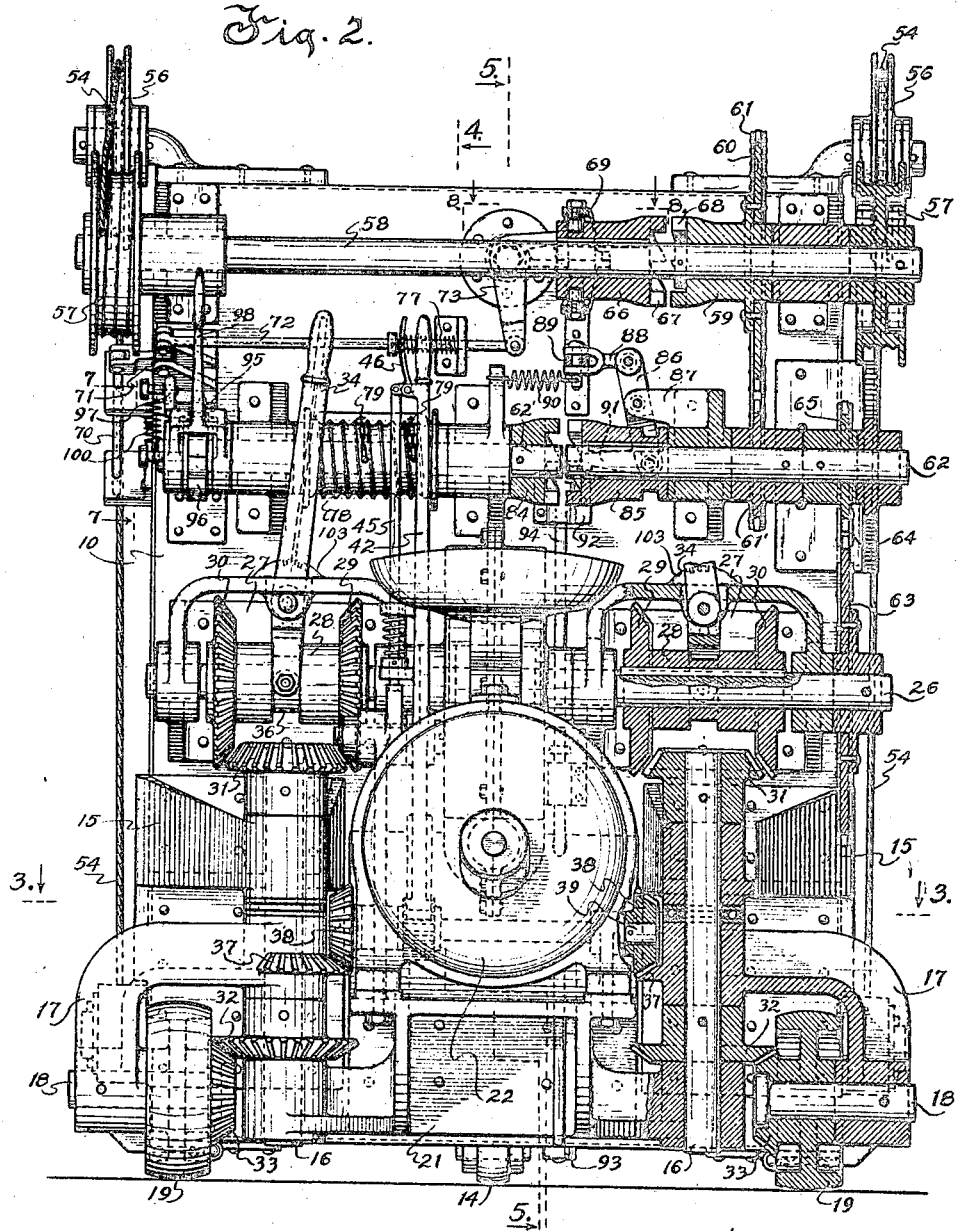

In the drawings: Fig. 1 is a side elevation of a machine embodying the invention; Fig. 2 is a rear elevation thereof; Fig. 3 is a section taken on the line 3—3 of Fig. 1; Fig. 4 is a section taken on the line 4—4 of Fig. 2; Fig. 5 is a section taken on the line 5—5 of Fig. 2; Fig. 6 is a section taken on the line 6—6 of Fig. 5; Fig. 7 is a detail view taken on the line 7—7 of Fig. 2; Fig. 8 is a section taken on the line 8—8 of Fig. 2; Fig. 9 is a section taken on the line 9—9 of Fig. 8; Fig. 10 is a plan view showing one method of introducing the machine into a box car and for carrying away the material discharged from the machine, and Fig. 11 is a side view similar to Fig. 10, parts being shown in section.

In the drawings the numeral 10 designates a bin or hopper having an opening 11 in its top through which the material is discharged into the hopper and a convexly curved front side 12. A bracket 13 is secured to the front end of the hopper and centrally thereof and forms a support for a caster wheel 14. Frame members 15 are secured to the rear end of the hopper in spaced relation and provide bearings for upright shafts 16 and wheel-supporting arms 17. The arms 17 carry wheel spindles 18 upon which wheels 19 are mounted. In this way the hopper is supported upon the front wheel 14 and the rear wheels 19. The bottom of the hopper is formed by a pair of dumping doors 20 meeting at their front edges and each hingedly connected to one side of the hopper and adapted to open downwardly to discharge the contents of the hopper.

A frame member 21 secured to the rear end of the hopper 10 forms a support for a motor 22, an electric motor being shown though other motor means may be used to furnish power for the machine. This member 21 has laterally extending arms forming bearings for the lower ends of the shafts 16.

The shaft 23 of the motor carries a worm 24 meshing with a worm wheel 25 upon a drive shaft 26 journalled in bearing brackets 27 secured to the rear side of the hopper. Slidable upon but secured to rotate with the shaft 26 are a pair of hollow shafts 28, each carrying oppositely disposed bevel gears 29 and 30, adapted to be brought into mesh, one at a time, with a bevel gear 31 upon the shaft 16 located below them. The shafts 16 also carry bevel gears 32 meshing with bevel gears 33 formed integral with or connected to the wheels 19. The movement of each shaft 28 upon the shaft 26, to bring either the gear 29 or gear 30 into driving engagement with the gear 31 for each shaft 16, is effected by a shifting lever 34 pivoted upon the bracket 27 and having a forked end operatively connected to the shaft 28 in a well-known manner by pins 35 seated in an annular recess 36 in said shaft. With this arrangement, when the levers 34 are moved toward each other the gears 29 are brought into mesh with the gears 31 so that the rotation of shaft 26 will, through these gears, shaft 16 and gears 32 and 33, drive the wheels 19 in the same direction to move the vehicle in a given direction, as forwardly, and when said levers are moved away from each other to bring the gears 30 into mesh with the gears 31 then the vehicle will be driven in the opposite direction, as rearwardly. Furthermore, if one of the levers 34 is moved to bring the gear 30 into mesh with the gear 31 of one shaft 16 and the other lever 34 is moved to bring the gear 29 into mesh with the gear 31 of the other shaft 16, then the wheels 19 will turn in opposite directions and a turning of the vehicle will be effected. Also the driving force may be applied to only one of the wheels 19. Thus the vehicle is capable of running forwardly or backwardly and of being turned to one side or the other and may turn about the front wheel 14 or about either of the rear wheels.

The wheel-supporting arms 17 are free to turn on the shafts 16 and are provided with bevel gear segments 37 meshing with bevel gears 38 upon a shaft 39 carrying a gear 40 meshing with a segmental gear 41 upon a lever 42. This lever 42 is pivotally mounted intermediate its ends upon the frame member 21 and is adapted to be held in different positions of adjustment in a well-known manner by means of a spring-pressed locking bolt 43 carried by the lever and engageable in any one of the series of notches on a lock plate 44, said bolt being connected by a link 45 with a hand lever 46 disposed adjacent the handle of the lever 42. The wheels 19 are normally disposed parallel to each other but to provide a braking effect under some conditions of operation these wheels may be turned to toe in toward each other by shifting the lever 42, which action turns shaft 39 by reason of the gears 41 and 40 and the turning of the shaft 39 will, through the gears 38 and 37, swing the arms 17 toward each other.

The brackets 15 carry trunnions 47 upon which the rear end of swinging arms 48 are mounted. The outer ends of these arms have side plates 50 connected thereto with their rear ends 51 overlapping the sides of the hopper and a bottom plate 52 is secured to the side plates to form a scoop or shovel which, in the present instance, is shown without a back, as the front 12 of the hopper forms a back for it, the radius of curvature of the front 12 being substantially the same as that through which the rear end of the scoop swings. When the machine is driven into the pile of bulk material the scoop receives its load and the arms 48 are then raised, and with them the scoop, to the dotted line position shown in Fig. 1, in which position the material is chuted into the hopper through the opening 11, the scoop being provided with inwardly curved side plates 53 to guide the material on its discharge.

The means for raising the scoop comprises cables 54, one for each arm connected at one end to a spring 55 carried on the forward portion of the arm and passing over guide pulley 56 and then around a drum 57 to which its other end is secured, said drum being mounted upon a shaft 58. A tubular shaft 59 is loosely mounted on the shaft 58 and carries a sprocket wheel 60 connected by a chain 61 with a sprocket wheel 61' on a shaft 62 which is driven from the shaft 26 by means of sprocket 63, chain 64 and sprocket 65. The tubular shaft 59 is adapted to be secured in driving relation with the shaft 58 by means of a clutch member 66 slidable upon but secured to rotate with said shaft 58. The member 66 has a jaw face 67 adapted to engage a jaw face 68 on the shaft 59 and a clutch shifting lever 69 of usual construction is adapted to shift said member 66 into engagement with the shaft 59.

When the scoop and the arms 48 are in the position to receive the load the cables 54 are unwound from the drums 57 to their greatest extent and the scoop rests upon or is disposed a short distance above the floor or bed upon which the machine is travelling. When the operator throws in the clutch 66 the motor 22 driving shaft 26 will, through the gearing connections described between the shafts 26, 62 and 58, cause a rotation of the shaft 58 to wind the cables 54 upon the drums 57 and elevate the scoop to discharging position, the discharge taking place as the scoop is moved rearwardly over the opening 11. The throwing out of the clutch permits the return of the scoop to load-receiving position.

In order that the operator may be relieved of the necessity for throwing out the clutch member 66 for each load of the scoop, an automatic mechanism is provided for this purpose, consisting of a trip member 70 adapted to be struck by one of the arms 48 as it is completing its upward swinging movement and to be moved by said arm and transmit its own movement to a lever 71 and link 72 to a bell crank lever 73 having an arm 74 provided with a stop shoulder 75 to engage the lever 69 when the clutch is thrown in but to be released from said lever by the movement of the trip member 70, the release of said lever 73 permitting a spring 76 to shift the lever 69 to throw the clutch member 66 out of engagement with the shaft 59. The trip member 70 and the lever 69 are returned to operative position to hold the clutch in by means of a spring 77.

A shaft 62' is provided with a double drum 78 for cables or chains 79 which pass through an opening 80 in the rear side of the hopper, thence over upper guide pulleys 81, lower guide pulleys 82 adjacent the rear end of the hopper and guide pulleys 83 adjacent the front end of said hopper and are secured at their ends to the bracket 13. The shaft 62' is alined with the shaft 62 and carries a jaw clutch member 84. The shaft 62 carries a jaw clutch member 85 rotating with but slidable upon said shaft into engagement with the member 84. A forked clutch lever 86 having its forked end engaging the member 85 is pivotally mounted intermediate its ends upon a bracket 87 and is connected by a link 88 with a shifting lever 89. A spring 90 acting on the lever 89 acts through the linkage above described to disengage the clutch members 84 and 85.

After the doors have been opened to dump the load the operator moves the lever 89 against the action of the spring to throw the member 85 into mesh with the member 84 so that the shafts 62 and 62' are coupled together and the rotation of said shafts winds up the chains 79 upon the drum 78 to lift the doors. When the clutch for the drum-winding mechanism is thrown in by the operator a locking dog 91 on the lever 86 engages a latch plate 92 to hold the clutch in. As the final closing movement of the doors takes place a lug 93 on one of the doors strikes a trip rod 94 and moves said rod upwardly, causing it to disengage the dog 91 from latch 92 so that the spring 90 may throw out the drum-winding clutch. Unwinding of the chains 79 from the drum 78 is normally prevented by a retaining pawl 95 engaging a ratchet 96 on the shaft 62'. When it is desired to empty the hopper the pawl 95 is released from the ratchet 96 by means of a cam 97 on a dumping lever 98 which engages a projection 99 on the pawl 95. A spring 100 connecting the pawl 95 with the lever 98 holds the pawl in engagement with the ratchet 96. The pawl 95 has a stop projection 101 engageable with the frame of the machine to limit its movement. The release of the pawl 95 from the ratchet 96 permits the weight of the load in the hopper to open the doors 20 and unwind the cable.

Where the machine is used for unloading box cars a support 106, carried by vertically adjustable jacks 107 on piers 108, carries a platform 109 over which the machine travels into and out of the box car 110, and upon which it may stand to discharge its load onto a conveyor belt 111 through openings 112 and 113 in the platform 109 and support 106, respectively, as shown in Fig. 11. The platform 109 is adjusted vertically to bring it level with the floor of the box car by means of the jacks 107, and is mounted on rollers 114 in front and gears 115 behind so that it may be moved laterally with respect to the support 106 to bring its front edge adjacent the door opening of the car, the lateral adjustment being provided to accommodate box cars of different widths.

In unloading bulk material from box cars the operator, occupying the seat 105, throws in the power to the propelling wheels 19 by the manipulation of the clutch levers 34 to drive the machine into the box car through the door thereof from the platform 109 and directs the scoop 50 against the material near the door, which scoop is lifted to discharge its load into the hopper 10 by the operator shifting lever 69 to throw in clutch members 66 and 59. As soon as the scoop 50 has discharged its load the clutch member 66 is automatically thrown out by the mechanism previously described, including the trip member 70 which is struck by one of the arms 48, the scoop then descends to its position in front of the hopper, is again driven into the material to receive its load, is again lifted to discharge another load of the material into the hopper and returns to its load-receiving position, and these operations are repeated until the hopper has been filled. During this time the operator may shift the machine into different positions about the car so that the scoop may receive its loads by proper manipulation of the propelling clutches through the shifting of the levers 34, and, in case it s necessary, through the shifting of the lever 79. After the hopper has been filled the machine is backed through the door of the box car onto the platform 109 in a position to bring the dumping doors 20 over the openings 112 and 113, the lever 98 is then lowered to lift the pawl 95 to permit a turning of the drums 78 which are turned by the weight of the material operating to open the doors 20, the material then falls out of the hopper onto the belt 111 by which it is conveyed to the place desired. The doors are then returned to closed position when the operator shifts lever 89 to throw in the clutches 84 and 85 and, as soon as the doors have closed, clutches 84 and 85 are automatically thrown out by the mechanism previously described, including the trip rod 94 which is struck by the projections 93 on one of the closing doors. The machine is then driven into the car again to receive another load and in this way the contents of the box car are removed therefrom and transported to the place desired. It is to be understood that other arrangements than the belt 111 may be used for receiving material discharged from the hopper 10.

I desire it to be understood that this invention is not to be limited to any specific form or arrangement of parts except in so far as such limitations are specified in the claims.

What I claim as my invention is:

1. In a box-car unloading machine, the combination of an automotive vehicle having a hopper, said vehicle being movable into the box-car and within the same and having propelling means permitting its forward, backward or turning movement within the box-car, and including traction wheels, means for varying the angularity of said traction wheels to produce a braking effect, and means, including a scoop, for filling the hopper with charges of the material within the car as the vehicle moves about within the car.

2. In a box-car unloading machine, the combination of an automotive vehicle having a hopper, said vehicle being movable into a box-car and within the same and having propelling means permitting its forward, backward or turning movement within the box-car, and means, including a swinging scoop operating in front of the hopper, for filling the hopper with charges of material within the car as the vehicle moves about within the car, said propelling means including a prime mover back of said hopper.

3. In an unloading machine, the combination of a wheel-supported dischargeable hopper carrying a motor and having a front caster wheel and a pair of rear propelling wheels, swinging wheel supports for said wheels, means for varying the angularity of said supports with respect to each other to produce a braking effect, a transmission shaft operatively connected with the drive shaft of the motor, a wheel drive shaft operatively connected to each propelling wheel, reversible driving connections between each wheel drive shaft and said transmission shaft, and means driven by the motor for loading material into the hopper.

4. In a box-car unloading machine, the combination of an automotive vehicle having a dischargeable hopper, said vehicle being movable into the box-car and within the same and having propelling means permitting its forward, backward or turning movement within the box-car and including traction wheels, means for varying the angularity of said traction wheels to produce a braking effect, and means, charged by the movement of the vehicle, for filling the hopper with charges of the material within the car as the vehicle moves about within the car.

5. In an unloading machine, the combination of a motor-driven vehicle having a temporary storage hopper provided with dumping doors, a drum shaft, flexible connections between said drum shaft and doors, means for preventing rotation of said drum shaft to hold the doors in closed position, means for releasing the drum shaft to permit the weight of the material opening said doors, motor-driven means for winding up said connections on said shaft to close the doors including a clutch, and means operated by the doors for automatically throwing out said clutch when the doors have been moved to closed position.

6. In an unloading machine, the combination of a motor-driven vehicle, a pair of swinging arms mounted on the vehicle, a scoop carried by said arms and projecting in front of the vehicle, said scoop having a bottom and side portions, and a hopper on the vehicle into which said scoop discharges having a curved front side over which the scoop moves, and means for raising and lowering the scoop.

7. In an unloading machine, the combination of a motor-driven vehicle having a pair of propelling wheels, swinging wheel supports for said wheels, means for varying the angularity of said supports with respect to each other, whereby to move said wheels toward each other to produce a braking effect, means operatively connected with the motor for driving both wheels forwardly or backwardly or for driving one wheel in the reverse direction from the other, and means to load said hopper including a scoop carried by and moved by the movement of the vehicle into the material being handled to receive its load.

8. In an unloading machine, the combination with a wheeled vehicle, of a motor carried thereby, a transmission shaft operatively connected with the drive shaft of the motor, a pair of oppositely disposed bevel gear units slidably mounted on said shafts, a pair of upright shafts, each carrying a gear adapted to mesh with either one of the bevel gears of one of said gear units, a swinging wheel support journalled on each upright shaft, wheels carried by said wheel supports, a gearing connection between each wheel and the upright shaft upon which its support is journalled, means for varying the angularity of said wheel supports with respect to each other whereby to move said wheels toward each other to produce a braking effect, means for shifting each bevel gear unit, and means including a scoop carried by and moved by the movement of the vehicle into the material being handled to receive its load.

9. In an unloading machine, the combination of a motor-driven vehicle having a temporary storage hopper provided with dumping doors, a pair of swinging arms mounted on the vehicle, a scoop carried by the arms and projecting in front of the vehicle, means driven from the propelling motor for raising said arms to discharge the contents of said scoop including a clutch, means for automatically throwing out said clutch when the scoop has discharged its load, door-operating means actuated from the propelling motor for raising the doors including a clutch, means for automatically throwing out said clutch for the doors when the doors have been moved to closed position, and means for retaining the doors in closed position.

10. In an unloading machine, the combination of a motor-driven vehicle, a movable scoop disposed in front of the vehicle to receive its load when driven into the material being handled, a hopper, means driven by the motor for raising the scoop to discharge its contents into said hopper, automatic control means for said scoop-raising means, a dumping door for the hopper, means driven by the motor for raising said door, automatic control means for said door-raising means, and means for holding the door closed.

11. The combination with a box car, of a platform, a motor-driven vehicle adapted to move from said platform into and out of the box car and provided with a temporary storage hopper and with means for loading material in the car into said hopper, means for adjusting the height of said platform to bring it level with the floor of the box car, and means for adjusting the platform laterally to position it adjacent the side of the box car.

12. In an unloading machine, the combination of a wheel-supported hopper carrying a motor at the rear and having a pair of propelling wheels driven by the motor, a pair of swinging arms pivotally mounted adjacent the motor, a scoop carried by the arms and projecting in front of the vehicle, means driven from the propelling motor for raising said arms to discharge the contents of said scoop into the hopper, and control means for the scoop situated adjacent the motor.

13. In an unloading machine, the combination of a wheel-supported hopper carrying a motor and having a front caster wheel and a pair of propelling rear wheels, swinging wheel supports for said rear wheels, means for varying the angularity of said supports with respect to each other to produce a braking effect, means operatively connected with the motor for driving both rear wheels forwardly or backwardly or for driving one rear wheel in the reverse direction from the other, and means driven by the motor for loading material into the hopper.

In testimony whereof, I affix my signature.

RUDOLPH C. FRANCKE.